…

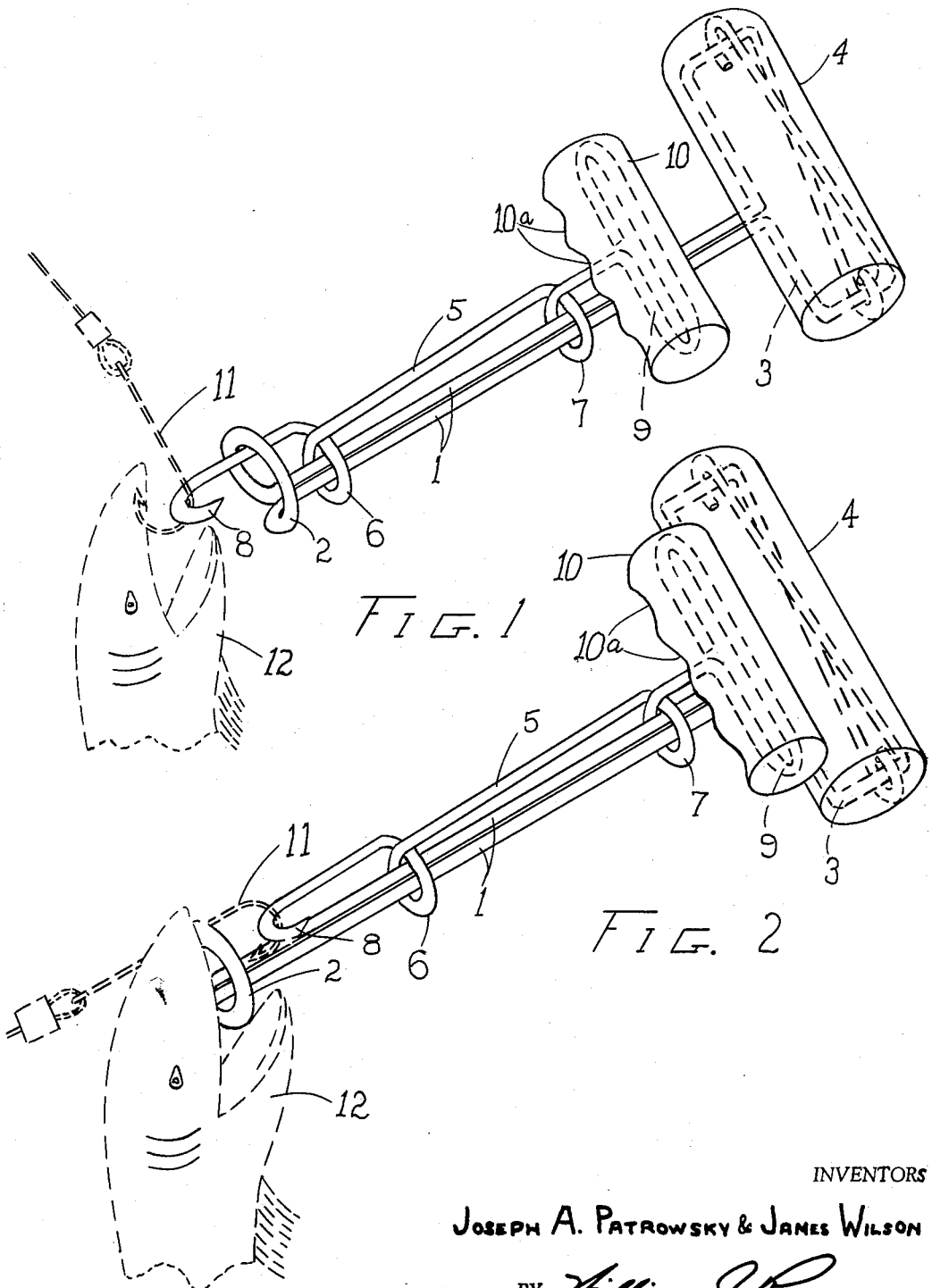

United States Patent Office 2,749,653
Patented June 12, 1956

2,749,653

FISHHOOK REMOVER

Joseph Alexander Patrowsky and James Wilson, McKees Rocks, Pa., assignors to Thomas Edmund Nolfi and James Wilson, McKees Rocks, Pa.

Application August 31, 1954, Serial No. 453,259

4 Claims. (Cl. 43—53.5)

This invention relates to a fish hook remover, and more particularly, to a device for removing or extricating hooks from the jaws or mouth of a fish.

Fish hook removers are known in the art but have not been generally adopted commercially, apparently for the reason that such devices are relatively complicated in construction, expensive to manufacture and priced out of reach of the ordinary fisherman. Furthermore, many such devices are not reliable in operation.

An object of our invention is to provide a fish hook remover that will be devoid of the above named disadvantages and which is of simple construction, involving inexpensively manufactured parts.

Another object of our invention is to provide a fish hook remover that may be made entirely from two pieces of wire which have been bent so as to provide two relatively slidable parts.

A still further object of the invention is to provide a fish hook remover which avoids the necessity of holding or contacting the fish while removing the hook.

Other objects and advantages of the present invention will become apparent from a study of the following description taken with the accompanying drawing, wherein:

Figure 1 is a perspective view of a fish hook remover embodying the principles of the present invention and shown in the initial position when the hook is engaged for removal, and Figure 2 is a perspective view of the device shown in Figure 1 but showing the parts in the position after completion of the removal of the hook from the fish's mouth.

Referring more particularly to the drawing, numeral 1 denotes a piece of wire of steel, aluminum or other suitable metal or material, which wire may be bent so as to form two immediately adjacent straight portions, a looped portion 2 at one end thereof and a rectangular handle portion 3 at the other end thereof, all forming one of the relatively slidable parts of the fish hook remover. Preferably a plastic handle 4 is molded about the handle portion 3 so as to form a substantially cylindrically shaped handle.

The second part of the fish hook remover is formed from a piece of wire 5 spaced in parallel relationship to wire 1 and being bent to form two eye portions 6 and 7 at right angles thereto, to form a hook portion 8 at one end thereof and a closed loop handle portion 9, which, in turn, is embedded in a plastic handle 10 provided with finger grip impressions along one side thereof. Thus wire 5 and its associated handle 10 is relatively slidable in a longitudinal direction with respect to wire 1, and is guided by the latter by means of eye portions 6 and 7.

In operation, assume that a hook 11 has been lodged into a mouth portion of fish 12 as shown in Figure 1, then by looping the hook portion 8 about the curvature of fish hook 11 and upon grasping, by one hand, both handles 4 and 10 and pulling them together, hook portion 8 is pulled away from the fish through looped portion 2. At the same time, looped portion 2 is pushed against the mouth of the fish, as shown in Figure 2, until finally the relatively slidable parts forming the fish hook remover will extricate or remove the fish hook 11 in a manner reverse to that in which it entered. More specifically, as the handles 10 and 4 are pulled together, the eye portion 2 forms an anchor against the mouth of the fish while pulling of handle 10 has the effect of pulling hook 11 toward loop portion 2—further pulling pulls the loop of hook 11 through loop portion 2 and extricates the hook 11 from the mouth of the fish. Thus the fish is unhooked without the necessity of handling or touching it, which handling is often times objectionable, particularly of undesirable species.

After the fish has been unhooked, the handles 4 and 10 are spread apart again from the portion shown in Figure 2 to that shown in Figure 1 so as to be in readiness for unhooking the next fish. For larger hooks, a larger diameter eye portion 2 may be used.

While the fish hook remover is described as being made of bent wire, it will be apparent that other forms of construction may be used instead to provide the relatively slidable parts, one having a hook at the extreme end and the other a loop through which the hook may pass in the process of extricating the fish hook from the mouth of the fish. Likewise plastic handles 4 and 10 may be omitted if so desired. Or the entire construction may be made of plastic particularly reinforced plastic.

While we have illustrated and described one embodiment of our invention, it will be understood that these are by way of illustration only, and that various changes and modifications may be made within the contemplation of our invention and within the scope of the following claims.

We claim:

1. A fish hook remover, comprising a pair of longitudinally slidable parts, said parts each having a handle portion at one end thereof, said handle portions being disposed in closely spaced, parallel relationship, one of said parts having a hook at the other end, and the other of said parts having a loop at the other end extending in a plane at right angles to said parts and through which said hook is adapted to pass as the handle portions are grasped and moved together.

2. A fish hook remover comprising a pair of separate, relatively slidable parts, one of said parts having a substantially straight central portion, a transversely extending looped portion at one end and a handle portion at the other, and the other part having a looped guiding means in an intermediate portion thereof for guiding said other part in its relative longitudinal movement with respect to the first mentioned part and having a hook portion at one end and a handle portion at the other, said hook portion being slidable through the opening of said looped portion as the result of movement of said handle portions toward each other, whereby said hook will extract a fishhook from the flesh of a fish as the looped portion serves as a stop element to hold the flesh.

3. A fish hook remover comprising a pair of separate, relatively slidable members formed of wire, one of said members having a straight central portion, a laterally loop portion at one end and a handle portion at the other, the other member comprising an intermediate portion having a pair of loops encircling said straight portion and having a hook at one end thereof adapted to project through the opening of said loop portion and having a handle at the other end thereof, whereby upon the grasping and pulling together of said handles, said hook will move from one side of said loop portion, through the opening of the loop and to the other side thereof to permit the hook to extract a fishhook from a fish as the loop portion is held against the mouth of the fish to prevent movement thereof.

4. A fish hook remover comprising a pair of separate relatively slidable, longitudinally extending wire members, one of said wire members being bent so as to form two intermediate spaced loops to serve as guide elements for sliding movement of the other wire and having a hook portion at one end and being bent transversely at the other end so as to form a handle portion, the other wire member comprising two wire portions in side-by-side relationship throughout the major portion of its length which are slidably guided by said loops and terminate in a laterally extending handle portion at one end and a transversely extending loop portion at the other end through which said hook portion is movable, said handle portions being enclosed in plastic handle grips disposed in parallel relationship and extending at right angles to the direction of movement of said wire members, whereby when said handle grips are grasped and pulled together, said hook portion will move from one side of said loop portion, through the opening of the loop portion and to the other side thereof in such a manner that it may extract a lodged fishhook which is hooked by said hook portion as the loop portion holds the fish against movement.

References Cited in the file of this patent

UNITED STATES PATENTS

| | | |
|---|---|---|
| 1,030,698 | Wilson | June 25, 1912 |
| 1,055,748 | Howse | Mar. 11, 1913 |
| 2,512,818 | Wikarski | June 27, 1950 |
| 2,688,816 | Bondeson | Sept. 14, 1954 |

FOREIGN PATENTS

| | | |
|---|---|---|
| 311,624 | Great Britain | May 16, 1929 |